(12) United States Patent
Sakamaki et al.

(10) Patent No.: US 6,839,050 B2
(45) Date of Patent: Jan. 4, 2005

(54) TACTILE INTERFACE DEVICE

(75) Inventors: Katsumi Sakamaki, Ashigarakami-gun (JP); Kazuyuki Tsukamoto, Ashigarakami-gun (JP); Shin Takeuchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 252 days.

(21) Appl. No.: 10/080,550

(22) Filed: Feb. 25, 2002

(65) Prior Publication Data

US 2003/0034954 A1 Feb. 20, 2003

(30) Foreign Application Priority Data

Aug. 17, 2001 (JP) ........................................ 2001-247806

(51) Int. Cl.[7] ................................................ G09G 5/00
(52) U.S. Cl. ....................... 345/156; 345/184; 345/702; 701/23; 701/36
(58) Field of Search ......................... 345/156, 700–702, 345/184; 340/502–504, 517, 825.36, 825.37; 701/1, 2, 23, 36, 55, 49

(56) References Cited

U.S. PATENT DOCUMENTS 6,256,558 B1 * 7/2001 Sugiura et al. ................. 701/1
6,563,487 B2 * 5/2003 Martin et al. ................ 345/156
6,636,197 B1 * 10/2003 Goldenberg et al. ......... 345/156
2002/0105495 A1 * 8/2002 Numata et al. .............. 345/156
2003/0030619 A1 * 2/2003 Martin et al. ................ 345/156
2003/0038776 A1 * 2/2003 Rosenberg et al. .......... 345/156

FOREIGN PATENT DOCUMENTS

JP    2000-330688 A    11/2000

* cited by examiner

*Primary Examiner*—Henry N. Tran
(74) *Attorney, Agent, or Firm*—Oliff & Berridge, PLC

(57) ABSTRACT

The disclosed tactile interface device conveys a diversity of information to its operator through the operator's tactile sense without requiring the operators visual confirmation. The tactile interface device comprises a substructure on which magnets are arranged so that the positive and negative magnets are alternately placed, a frame that is movable on the substructure and on which coils are installed, and a pushbutton switch fixed to the frame. The operating element drive control means drives the switch in the two-dimensional direction by allowing current to flow through the coils in a predetermined direction, so that a motion pattern appropriate for the information to be conveyed to the operator is generated. Information is imparted to the operator from the switch through the operator's tactile sense.

9 Claims, 7 Drawing Sheets

(a) WAVEFORM A

(b) WAVEFORM B

- $R_o$ : GROSS RESISTANCE OF POTENTIOMETER
- $R_L$ : LOAD RESISTANCE
- Ein : INPUT VOLTAGE
- Eout : OUTPUT VOLTAGE (a) WAVEFORM C (b) WAVEFORM D

US 6,839,050 B2

TACTILE INTERFACE DEVICE

BACKGROUND OF THE INVENTION

1. Field of the Invention

The present invention relates to a tactile interface device and, more particularly, to a structure of such a device capable of conveying information to the operator through the tactile sense and to a method of employing such a device.

2. Description of Related Art

Conventionally employed operating switches found on equipment mounted on motor vehicles such as automobiles, motorcycles, and the like, are simple, most commonly, pushbutton, toggle, and slide switches. These switches are designed to function by relatively simple operation so that the operator can use them with out visually confirming their performance. Recently, however, equipment mounted on motor vehicles, including that for vehicle use and optional equipment such as air-conditioners and audio systems, have grown increasingly sophisticated. Consequently, recent trends are that an increasing number of switches are installed on the instrument panel of a vehicle or that multiple functions are assigned to one operating switch. As a result, switch operating procedures have become complex. Proper operation of the switches of such sophisticated equipment is especially difficult while driving. In some circumstances, the driver must visually confirm the switch performance. Furthermore, some motor vehicles are now equipped with an information processing devices such as a car navigation system. Such devices usually require the driver to often turn his or her eyes away from the view in front of him to view the device's display.

In consequence, at the present, there is a trend wherein the quantity of information that the driver supplies to on-the-vehicle equipment by operating a switch or the like, as well as the quantity of information that the driver receives from the equipment, tends to increase more and more. Because the driver receives most of the information visually, a great and increasing burden is placed on the driver's visual attention and eyesight. In view thereof, there is a need for an interface device that is able to convey information to the driver by some means other than visually rendering information to the driver.

SUMMARY OF THE INVENTION

An object of the present invention devised to solve the above-described problem is to provide a tactile interface device capable of conveying a diversity of information to the operator through their tactile sense and without requiring the operator to use his or her eyes.

In order to achieve the above object and in accordance with one aspect of the present invention, a tactile interface device is provided. Such a tactile interface device may comprise a substructure member, an operating element for operation by the operator of said tactile interface device, a movable member which is mounted movably on said substructure member and to which said operating element is fixed, and an operating element drive control means for driving said operating element in one or two dimensions by moving said movable member, wherein said operating element drive control means drives said movable member to move following a predetermined motion pattern corresponding to information to be supplied to the operator. The operating element drive control means may drive the movable member to move, following one a plurality of predetermined motion patterns corresponding to the information to be supplied to the operator.

The operating element drive control means may drive the movable member to move, following a motion pattern that allows the operator to feel a predetermined resistance to operating of the operating element.

The tactile interface device may be applied to electronic equipment for on-vehicle use.

In a typical embodiment of the invention, the tactile interface device is placed to a steering wheel at or near locations where the driver is likely to grip the wheel or rest their hands. In another mode, the operating element drive control means generates one among a plurality of predetermined different motion patterns corresponding to the distance between the present position of the vehicle and a destination point, thereby providing the operator with tactile information indicating the distance from said present position to said destination point.

In another aspect of the present invention, a tactile interface device is provided that comprises a substructure member, a touch element to be touched by the operator of said tactile interface device, a movable member which is mounted on and is movable relative to said substructure member and to which said touch element is fixed, and a touch element drive control means for driving said touch element in one or two dimensions by moving said movable member, wherein said touch element drive control means drives said movable member to move in a predetermined motion pattern corresponding to manipulation of said touch element by an operator.

A tactile interface device provided in accordance with the present invention is able to convey a variety of information to an operator through their tactile sense without requiring the operator to view a visual display. Because the operating elements can be driven to move in a wide variety of patterns, the number of switches can be reduced by installing the tactile interface device of the present invention.

The operator can operate the tactile interface device in different ways and the switch can make the operator feel a diversity of resistances accordingly. It is feasible that various kinds of motion patterns to impart different resistance feelings be predetermined, so that one device can function in place of a plurality of switches.

DESCRIPTION OF THE PREFERRED EMBODIMENTS

The present invention now is described fully hereinafter with reference to the accompanying drawings, and through preferred embodiments of the invention.

Embodiment 1

Figure 1:
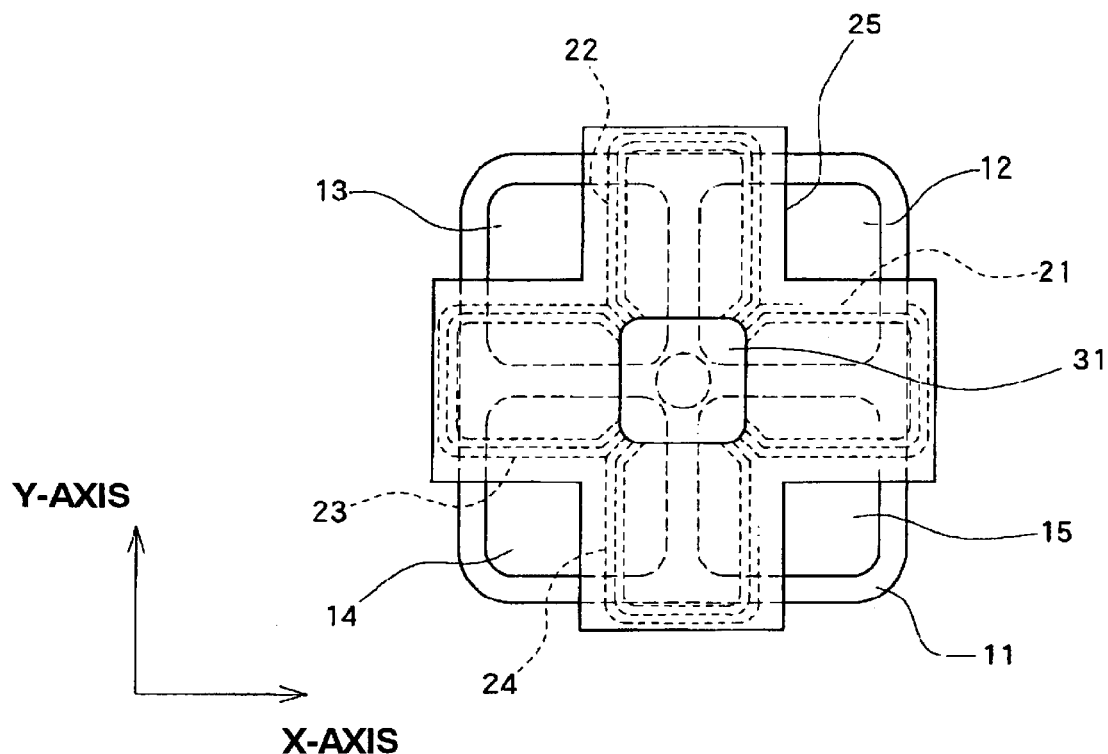
FIG. 1 is a plan view of an operating switch device according to a preferred Embodiment 1 of the present invention.
Figure 2:
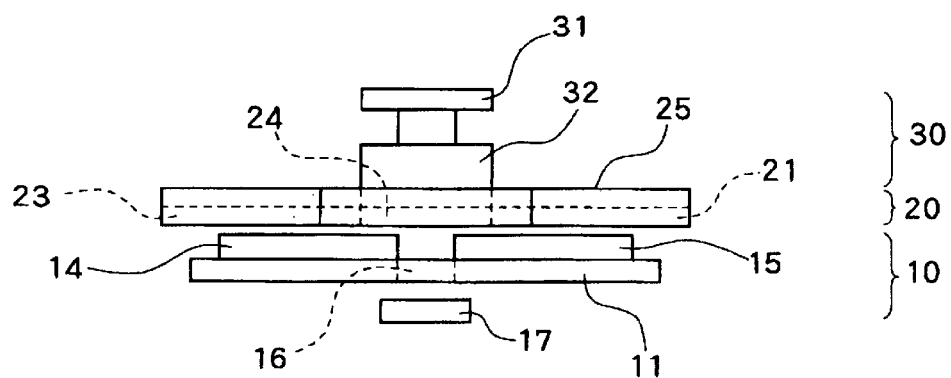
FIG. 2 is a side view of the operating switch device shown in FIG. 1.
Figure 3:
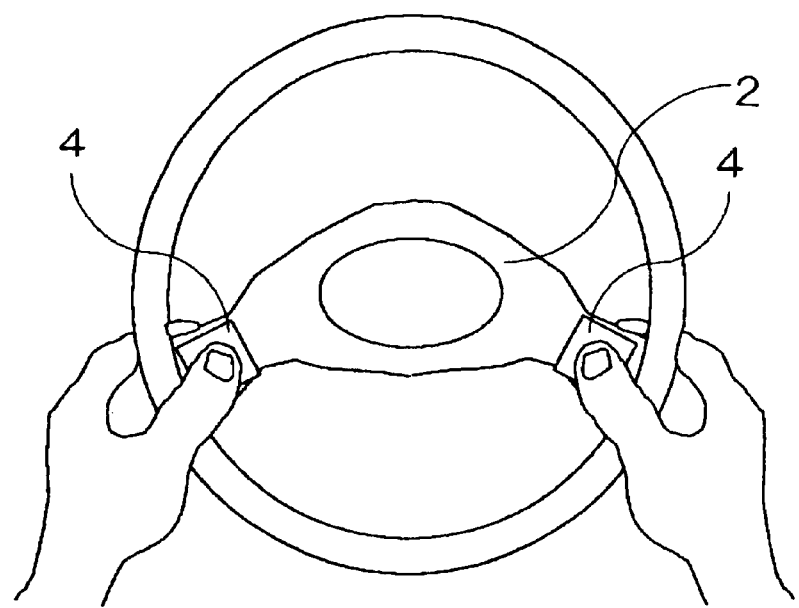
FIG. 3 represents an illustrative drawing of a steering wheel having a pair of the operating switches of Embodiment 1 placed thereto.

FIG. 1 is a plan view of an operating switch device according to a preferred Embodiment 1 of the present invention. FIG. 2 is a side view of the operating switch device shown in FIG. 1. FIG. 3 represents an illustrative drawing of a steering wheel having a pair of such operating switches of Embodiment 1 installed thereon. As apparent from FIG. 2, the switch device of Embodiment 1 consists of three layered parts, a stationary part 10, a movable part 20, and a switch part 30 bonded to the movable part 20. The stationary part 10 comprises a substructure 11 as the support of the operating switch, which is fixed to a steering wheel in Embodiment 1, and magnets 12, 13, 14, and 15 arranged on the substructure 11 so that the positive and negative magnets are alternately placed. The magnets 12 to 15 are arranged in pairs polarized in the direction of the thickness of the substructure 11 such that a magnetic field is produced between adjacent magnets. The substructure 11 has an opening 16 in its center, allowing a position sensor 17 located under the opening 16 to sense the motion of the movable part 20, or in other words, the motion of a switch 31.

The movable part 20 comprises coils 21, 22, 23, and 24 and a frame 25 on which the coils 21 to 24 are installed. According to Fleming's rule (the left-hand rule), by causing current to flow in a predetermined direction through the coils 21 and 23 aligned in the X-axis direction, the movable part 20 is driven along the Y-axis. Similarly, by allowing current to flow in a predetermined direction through the coils 22 and 24 aligned in the Y-axis direction, the movable part 20 is driven along the X-axis. Therefore, by directing a current through only one of the above pairs of the coils, the movable part 20 can be driven in one dimensional. When a current is directed through both pairs of coils, the movable part 20 can be driven in a two-dimensional direction expressed by the sum of the vector of the X-axis direction and the vector of the Y-axis direction. The movable part 20 is installed movably in this way on the substructure 11 in the stationary part 10, and is driven by operating element drive control means that comprises means (not shown) for controlling current flow across the coils 21 to 24 according to information to be communicated to the operator, the magnets 12 to 15 arranged in the stationary part 10, and the coils 21 to 24 arranged in the movable part 20. Because the switch part 30 is fixed to the movable part 20, the switch part 30 can be moved by driving and moving the movable part 20.

In Embodiment 1, the switch part 30 is provided in the form of a pushbutton switch 31. When the operator presses the switch 31, information is input through the switch device to the associated on-the-vehicle equipment. As the feature of Embodiment 1 is not concerned with the intrinsic structure of the pushbutton switch, the structure of the switch is not illustrated. The feature of the switch of Embodiment 1 is as follows. When the operator is pressing or touching the switch 31 while driving, the switch 31 is moved when activated and conveys information to the operator through the finger in contact with the switch 31.

In Embodiment 1, relative to the neutral reference position in which the switch 31 is set when no current flows through any of the coils 21 to 24, the switch 31 can be moved with the movable part 20 by causing current to flow through some or all of the coils. When the operating element drive control means obtains information to be conveyed to the operator, it drives the movable part 20 to move in a motion pattern appropriate for the information to be conveyed. Motion patterns are predetermined for all possible items of information. The operator can acquire information by sensing the motion of the switch 31 with his or her finger, based on the motion patterns. It is also possible to keep a constant current flowing through all coils 21 to 24 when the switch is placed in the reference position so as to keep load applied to the movable part 20. This can prevent the pushbutton switch 31 from deviating from its reference position.

Next, an example of application of Embodiment 1 will be illustrated below. A pair of operating switches 4 of Embodiment 1 configured in the above-described manner are provided on the steering wheel at or near locations where the driver is likely to rest his hands while driving, for example, at both ends of the arm 2 of the steering while. It is assumed that the driver's fingers are in constant contact with the pair of operating switches. By manipulating the pair of operating switches, the driver can issue a command to the onboard equipment to which the switches are connected. Meanwhile, the equipment supplies information to the operator in such a manner as will be described below.

In an example in which the motor vehicle is equipped with, for example, a navigation system, wherein an operating switch is driven under the control of an operating element drive control means in conjunction with the navigation system, one function of the navigation system is to provide the driver a route to a destination specified by the driver. If the vehicle must turn to the left at a crossing 200 meters ahead to arrive at the destination, then the navigation system normally visually displays the crossing and an indication that the driver should turning to the left at that location.

However, when circumstances do not allow the driver to look away from the view in the windshield, the driver will not be able to obtain this information. However, in Embodiment 1 of the present invention, the switches in contact with the driver's fingers are arranged such that, when the vehicle arrives at a point 200 meters before the crossing at which a left turn should be made, the switches perform a predetermined motion pattern; for example, on of the switches vibrates once. With reference to the above-mentioned switch 31, vibration can be produced by quickly oscillating its movable part 20 in alternate directions. Thereby, the switch can inform the driver through the driver's tactile sense that the vehicle must be turned to the left 200 meters ahead. Then, when the vehicle arrives at a point 50 meters before the crossing, a different vibration pattern can be performed; for example, the switch vibrates twice. Then, immediately before reaching at the crossing, the switch begins to continuously vibrates to inform the driver that the vehicle is at the crossing at which a left turn should be made. If the vehicle passes the crossing at which to turn to the left, the switch informs the driver of that fact by generating yet another pattern of vibrations of the switch 31.

In accordance with Embodiment 1, by generating different motion patterns depending on the distance between the present position of the moving vehicle and a destination point, the switch can convey specific information to the driver. In the above-described application example, specifically, by generating different vibration patterns, vibrating once, vibrating twice, and continuously vibrating, the switch can positively inform the driver (operator) of the approximate distance from the present position to the crossing through the operator's tactile sense. In this manner, the switch of Embodiment 1 conveys information that the driver should to turn to the left and that the vehicle is approaching the crossing to the driver by stimulating the driver's tactile sense. Consequently, the driver need not divert his attention away from the view in front in order to get information.

When input by the operation is not required as in the above-described application example, the switch part 30 is not necessary. In such cases, it is possible to remove the switch part 30 so that the operator can directly touch the movable part 20 or to simply employ the switch part 30 as the contact part that the operator touches.

While, in the above-described application example, by changing the number of times the switch vibrates, the switch allows the operator to distinguish the information to convey, it is also possible to change the direction of motion, the duration of vibration, intensity, etc. to allow the operator to distinguish the information by pattern differences.

The example operating switch of Embodiment 1 has a structure in which the switch part 30 can move in two dimensions. However, the operating switch can also be configured such that its motion takes place only in, for example, the horizontal direction to prevent vertical displacement.

Embodiment 2

While the above-described operating switch of Embodiment 1 can move in two dimensions, an operating switch provided in accordance with a preferred Embodiment 2 has a more simple structure and can moved only in one dimension.

Figure 4:
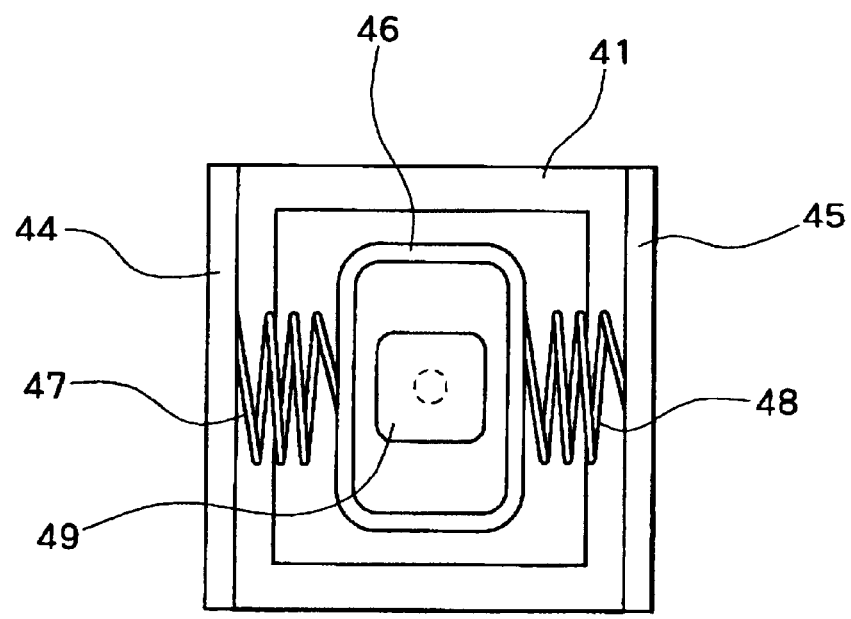
FIG. 4 is a plan view of an operating switch device configured, according to a preferred Embodiment 2 of the present invention.
Figure 5:
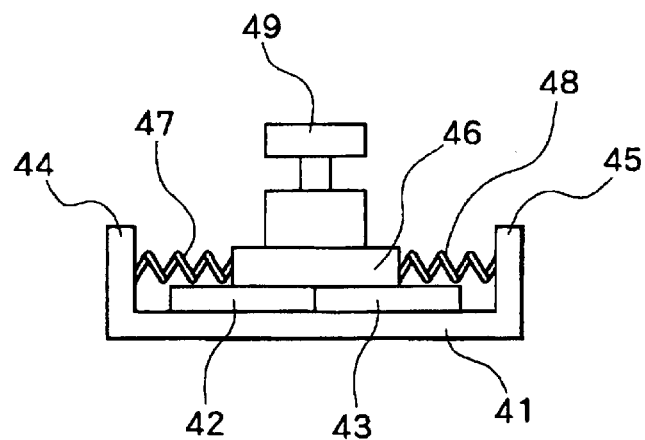
FIG. 5 is a side view of the operating switch device shown in FIG. 4.
Figure 6:
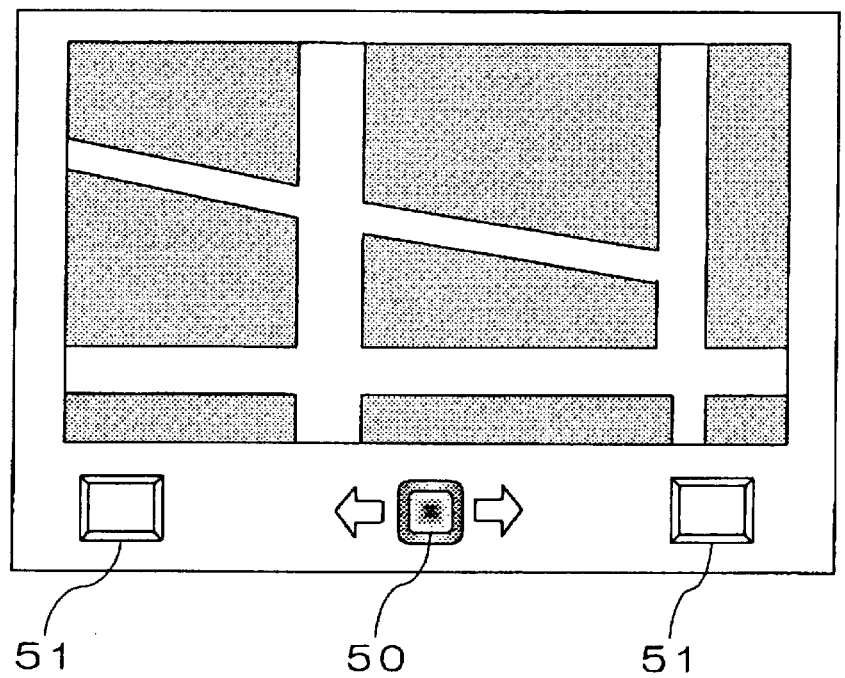
FIG. 6 illustrates a navigation system operating panel including the operating switch of Embodiment 2.

FIG. 4 is a plan view of an operating switch device configured according to a preferred Embodiment 2 of the present invention. FIG. 5 is a side view of the operating switch device shown in FIG. 4. FIG. 6 is an illustrative drawing of a navigation system operating panel including the operating switch of Embodiment 2. The structure of the switch device of Embodiment 2 can also be divided in three layer parts: stationary, movable, and switch parts. The stationary part comprises, to support the operating switch, a substructure 41 installed within the operating panel at the bottom of the display of the navigation system in Embodiment 2, and magnets 42 and 43 arranged on the substructure 41. The magnets 42 and 43 are opposite in polarity and polarized along the direction of the thickness of the substructure 41. On either end of the substructure 41, upright walls 44 and 45 are formed and a movable member slides one-dimensionally along the direction therebetween.

The movable member comprises a coil 46 mounted on the magnets 42 and 43 such that the coil is slidable on the magnets between the walls 44 and 45. The coil 46 is supported on either side by elastic support members 47 and 48. The other ends of the elastic support members 47 and 48 anchor to the inside of the walls 44 and 45, respectively. For the walls 44 and 45 and the elastic support members 47 and 48, some assigned switching functions may be performed by the wall and elastic support member provided only on either side. In Embodiment 2, coil springs as shown are used as typical elastic support members 47 and 48. The switch part 30 of Embodiment 2 comprises a switch 49 that takes the functions as a slide switch.

The movable part is installed in such a manner that it can slide one-dimensionally in the direction along the substructure 41 in the stationary part. The movable part is driven by operating element drive control means that comprises the magnets 42 and 43 in the stationary part, the coil 46 in the movable part, and means (not shown) for controlling current flow across the coil 46 in a predetermined direction, according to information to be given to the operator. In response to the operator's action, the switch 49 slides laterally between the walls 44 and 45 shown in FIG. 4. Furthermore, the operating element drive control means causes the switch 49 to move, following a predetermined pattern. A notable feature of Embodiment 2 is that the motion of the switch 49 applies a predetermined load on the finger touching the switch 49, as will be explained later.

Next, an example of application of Embodiment 2 will be illustrated below in which it is assumed that an operating switch 50 configured in the above-described structure is used in the navigation system illustrated in FIG. 6. Other operating switches 51 are of conventional type. Because a navigation system is generally found on an instrument panel between the driver's seat and the passenger seat, the driver must normally to look away from the view in front when operating the buttons 50 and 51.

Now, suppose that the driver wants to shift the displayed map to the right by 300 meters. In the conventional method, the driver shifts the displayed map, using the right cursor, visually confirms that it has shifted 300 meters, then terminates the operation. During this operation, however, the driver must look away from the view in front in order to confirm that the map has shifted 300 meters. On the other hand, in the present example of Embodiment 2, the operating switch 50 can be used as follows.

The driver slides the switch 49 to the right, while keeping his or her finger in contact with the switch. The driver's finger continues to touch the switch 49. When the navigation system informs the operating element drive control means that the displayed map has shifted by 50 meters, the means controls the movable part of the switch to move in a predetermined pattern. This motion may be, for example, a simple vibration or a light impulsion accompanied by a "click." The driver already knows that stimulation of his or her tactile sense occurs each time the displayed map has shifted by 50 meters. If, for example, the stimulation of the tactile sense is vibration, when the driver has sensed vibration six times after starting to slide the switch 49 to the right, he or she can know, through this tactile information, that the map has shifted 300 meters to the right, and the driver then removes his finger from the operating switch 50.

According to Embodiment 2, by using the operating switch 50 as described above, the driver can know that the map display has shifted 300 meters to the right through the tactile information provided. Consequently, the driver is not required to visually confirm a shift of the displayed map.

While, in the above illustrative case, the operating switch of Embodiment 2 is applied to a navigation system, the switch can also be used as the operating switch for other equipment or systems. For example, to the switch 49, by applying motion patterns such as vibration or resistive force (causing the operator to feel resistance) that increase as the vibration increases, a volume control function or the like can be achieved by the switch.

Embodiment 3

While, in the description of Embodiment 2, application of the operating switch shown in FIGS. 4 and 5 to a navigation system wherein the switch is used to shift a map by a certain distance was explained, a preferred Embodiment 3 is further illustrative case, one wherein the switch is used to convey other information to the driver.

In vehicles produced today, warning information indicating, for example, that the parking brake lever is not completely released or that a door of the vehicle is not completely closed is most commonly supplied to the driver by illuminating a corresponding warning light on the instrument panel. However, unless the driver looks at the section of the instrument panel including the lit warning light, this warning will not attract the driver's attention. Now, in Embodiment 3, the pair of operating switches is included on the steering wheel at a location where the driver will grip the wheel, such as shown in FIG. 3, allowing the driver to keep his or her fingers in contact with the switches. With this arrangement, the switches can convey information about the vehicle's state, such as the above-noted warnings, to the driver by stimulating the driver's tactile sense.

Figure 7:
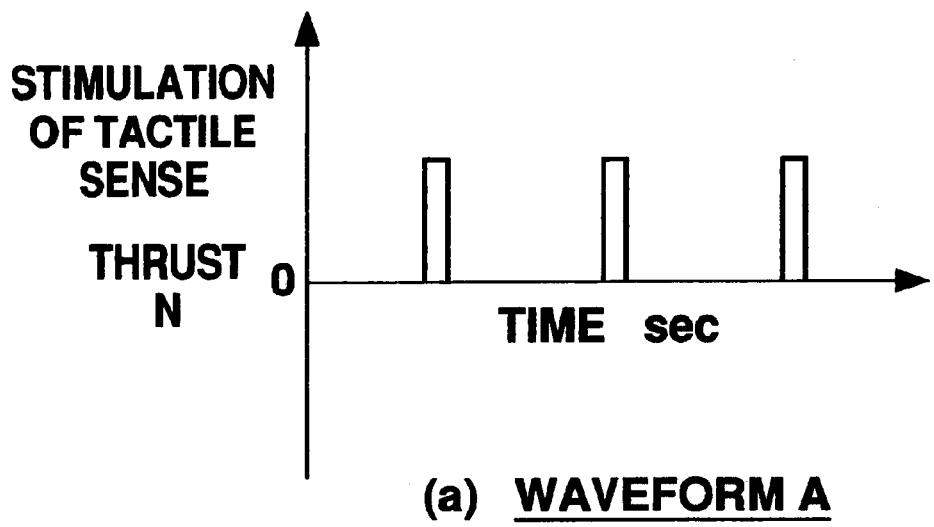
FIG. 7 shows exemplary waveforms of motion patterns that take place in the switches provided in accordance with a preferred Embodiment 3.
Figure 7:
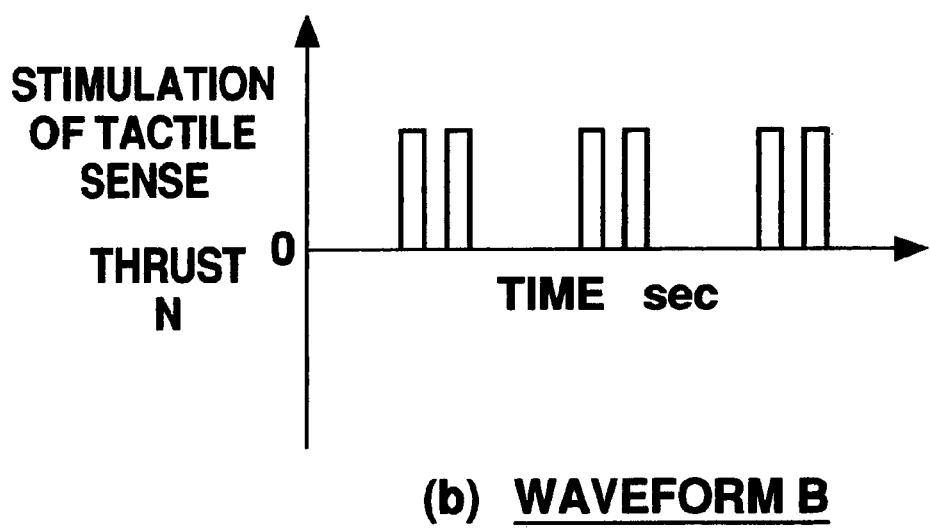

FIG. 7 shows exemplary waveforms of motion patterns produced in the switches by current controlled by the operating element drive control means. The motion patterns of the switch for attracting the driver's attention can be generated as follows. A specific pulse waveform is assigned to an information type, such as a warning, and a corresponding number of repetitions are generated as shown in FIG. 7(*a*) or (*b*). Alternatively, different waveform patterns may be set for different types of warning.

Embodiment 4

In the example illustrating the foregoing Embodiment 3, the switches provide the driver with a warning using pulse waveforms of one or two impulses conveyed to the driver's finger. A preferred Embodiment 4 in which various switch motion patterns are generated to which intelligible characters, symbols, etc. are assigned in advance enables the driver to understand, through information supplied through his finger, additional specific details of a warning.

Figure 8:
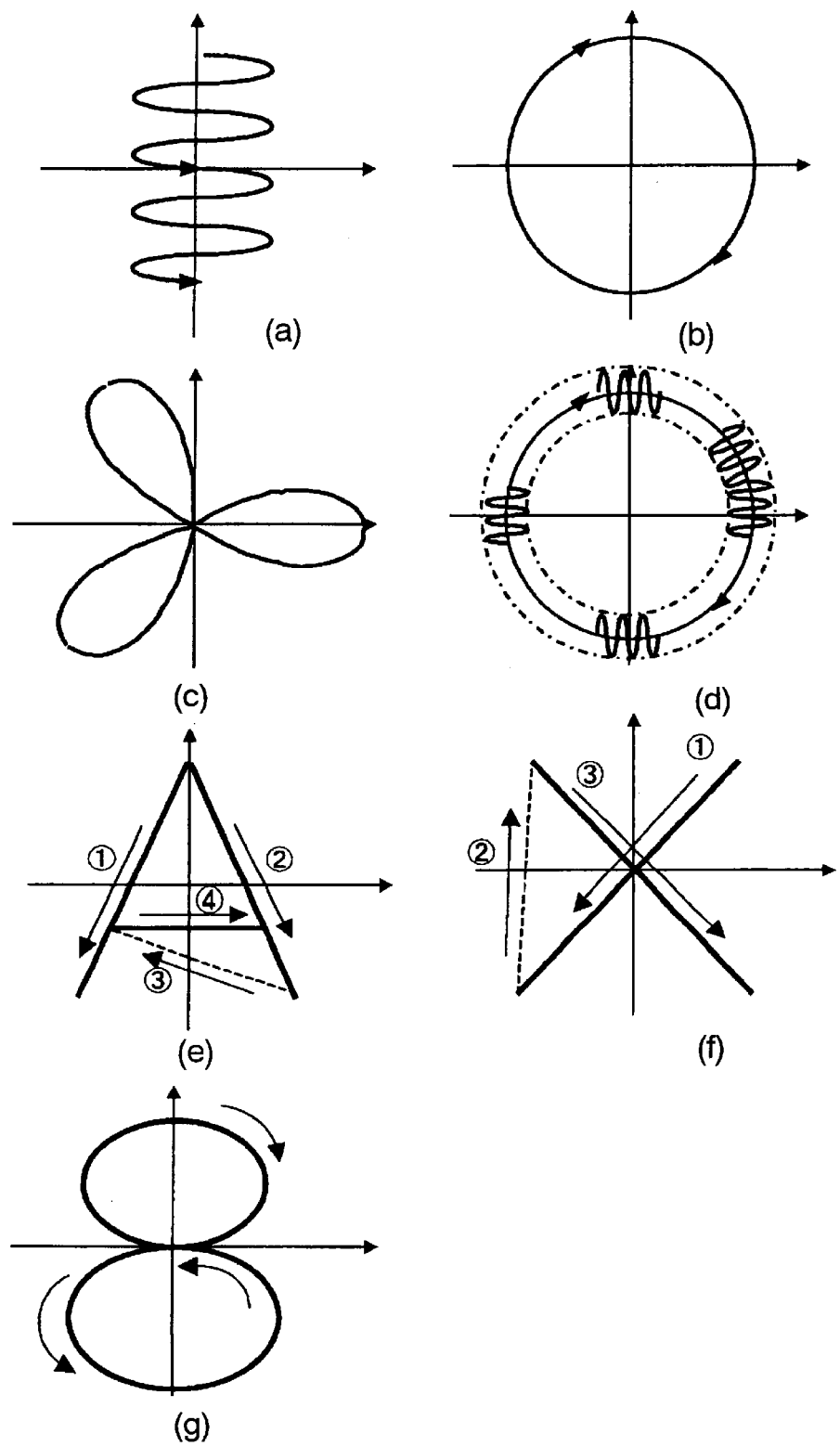
FIG. 8 shows example patterns of switch motion perceptible by the driver's finger for the switches provided in accordance with a preferred Embodiment 4.

FIG. 8 illustrates examples of patterns of switch motion perceptible by the driver's finger, generated with the operating switches on the steering wheel exemplified in Embodiment 1. FIG. 8 contains various motion patterns: (a) zigzag, (b) circular, (c) flower petal shape, (d) circular vibration pattern, (e) letter "A", (f) letter "X", and (g) numeric character "8." Specific meanings can be assigned to these patterns. For example, when the driver is looking for a parking facility using the navigation system and the vehicle is nearing such a facility, the switches vibrate as described in Embodiment 1, wherein the circular vibration pattern (d) is used as the vibration pattern in Embodiment 4. According to the distance to the parking, the frequency of the pattern may change. If the parking is located to the left of the course in which the vehicle is moving, the motion of the pattern (d) may be imparted through only the left operating switch.

Alternatively, if the driver begins to turn to the left and enter a narrow passing-prohibited path because of the exit of one-way street, the switch begins moving in the zigzag pattern (a) to indicate that the driver must not proceed. To convey information that is directly intelligible with a letter or numeric character, motion corresponding to an alphanumeric character can be used. In this way, various patterns are used in Embodiment 4, and various kinds of information can be conveyed to the driver through his or her tactile sense.

For a letter such as "A" that cannot be drawn in one stroke, relatively slow motion corresponding to the lines constituting the letter and relatively quick motion not relating to these lines, that is, this quick motion corresponds to return without contact with the surface on which the letter is drawn to draw a new line when the letter, is actually drawn. Thereby, it is possible to discriminate between the lines constituting the letter and other accompanying movements. As embodied in Embodiment 4, these discriminating motions can be performed in the switches while a finger remains in contact.

Embodiment 5

An operating switch provided according to a preferred Embodiment 5 takes the form of a slide switch that enables the operator to feel resistance generated by different load patterns while operating the switch. This slide switch will be explained in greater detail below.

Figure 9:
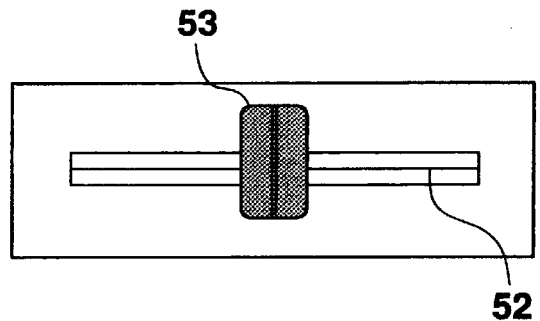
FIG. 9 is a view depicting the appearance of an operating switch device according to a preferred Embodiment 5.
Figure 10:
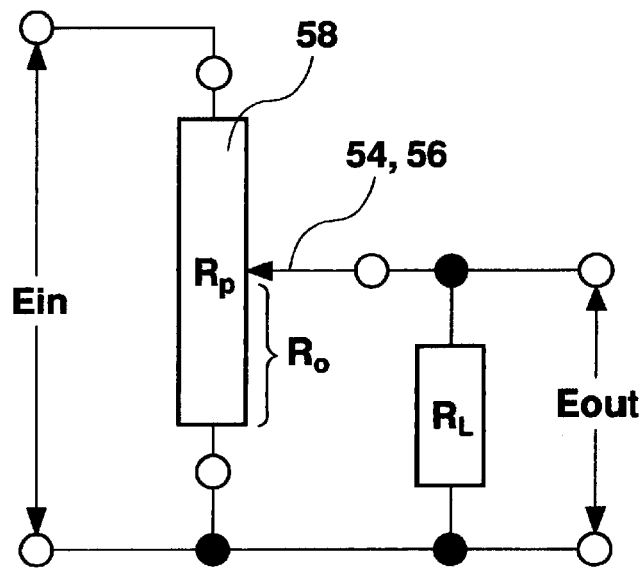
FIG. 10 is a diagram showing the configuration of a circuit for transforming displacement to voltage in Embodiment 5.

FIG. 9 is a view depicting the appearance of the operating switch device of Embodiment 5. FIG. 10 is a diagram showing the configuration of a circuit for transforming displacement to voltage, formed in the casing of the device. The operator inputs a desirable setting of sound volume, room temperature, or the like by sliding a slide control knob 53 corresponding to the operating element along a slot 52. The slide control knob 53 is attached to one end of an arm 54 that is a movable member extending from the inside of the device casing. To the other end of the arm 54, an attached brush 56 maintains contact with a resistor 58 in the circuit. By moving the brush 56, the output from the circuit can be varied continuously. Other than such contact manner, a manner in which the position of the slide control knob is measured by a linear encoder may, for example, be applied.

Figure 11:
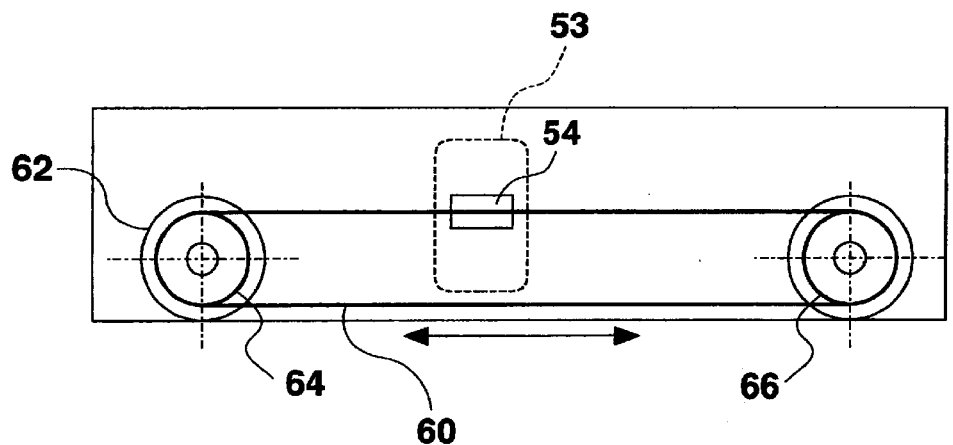
FIG. 11 represents a drive mechanism of the operating switch of Embodiment 5.

FIG. 11 represents a drive mechanism characteristic of Embodiment 5 for driving the slide control knob of the operating switch. This drive mechanism corresponds to the operating element drive control means. Inside the device casing, the arm 54 is connected to a rotary belt 60. The rotary belt 60 is threaded onto a driving pulley 64 mounted to the spindle of a motor 62 on one end and a driven pulley 66 on the other end. In the range between these pulleys, the slide control knob 53 can slide. The operating element drive control means (drive mechanism) controls operation of the motor 62 according to the content of information to be supplied to the operator such that the switch conveying the information to the operator is in contact with the slide control knob 53. The feature of Embodiment 5 is as follows. The drive mechanism causes the motor to operate at predetermined speeds and rotation torque values that vary according to the information to be conveyed. Consequently, the operator feels resistance that varies while sliding the slide control knob 53, wherein the resistance is used to make the operator feel switching on and off.

Figure 12:
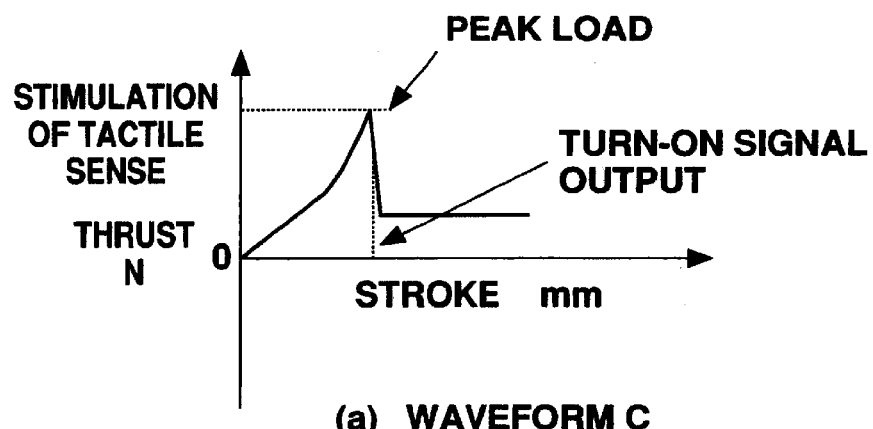
FIG. 12 shows exemplary waveforms representing resistance to sliding to take place in the operating switch of Embodiment 5.
Figure 12:
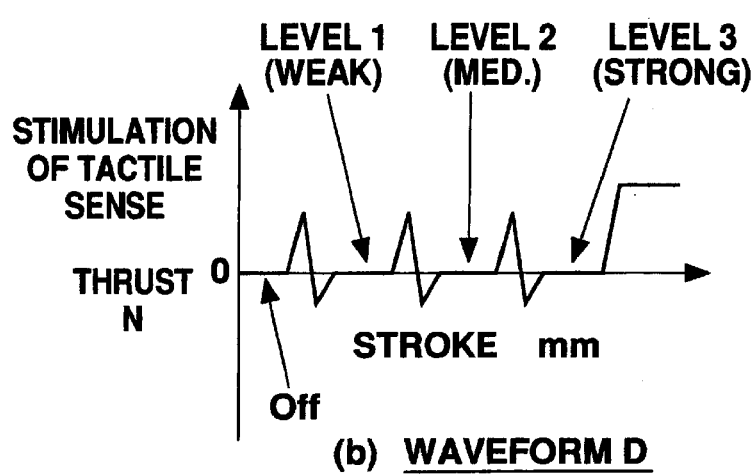

The operation principle of Embodiment 5 will be explained below, using illustrative examples. FIG. 12 shows exemplary waveforms representing resistance to sliding in the operating switch of Embodiment 5. FIG. 12(*a*) shows waveform C representing the transition of the load applied to the knob, wherein the load increases proportionally as the operator slides the knob gradually from the initial position, rapidly increases before the peak load, and is completely removed when the peak is reached. When drive is controlled in accordance with the waveform C, the impression of the operator would be as next described. As the operator is sliding the slide control knob 53, the resistance perceivable through his or her finger becomes stronger. When the peak load is reached, the operator feels a sudden release from the resistance. Through this release, the operator can know that the switch has been turned on or off. This resembles the "click" feeling when a gas burner is ignited by turning a control knob or the feeling of ignition of a lighter that ignites piezoelectrically. By applying the drive control based on the waveform C, the switch can stimulate the operator's tactile sense so that the operator perceives that the operating switch has been turned on.

FIG. 12(b) shows waveform D representing tactile stimulation for creating a sense of resistance recurring at certain intervals. Drive control in accordance with the waveform D can make the operator feel change in steps, for example, fan level change by the fan control of an air-conditioner for on-the-vehicle use. When the waveform shown in FIG. 12 occurs, the impression of the operator would be as next described. When sliding the slide control knob 53, the operator feels resistance, and then feels a release of resistance when he further slides the knob. By this, the operator can perceive that the fan has been set to level 1. When further sliding of the slide control knob 53, the operator again feels resistance and again feels a release of the resistance, indicating the change from fan level 1 to 2, and then again from level 2 to 3. In this way, the slide switch causes the operator to feel resistance and release from resistance, thereby enabling the operator to know that the switch has been turned on/off or a level has been set.

According to Embodiment 5, the slide switch enables the operator to feel predetermined resistance, according to an appropriate switch motion pattern exemplified by the foregoing waveforms C and D. The above-described tactile feeling of switching on/off is obtained in any case by sliding the slide switch and no physical and mechanical structure causing a "click-like" feeling is employed. By adjusting the waveform generated, in other words, the load applied, it is possible to allow the operator to easily feel the switching on and off, even when the switch actually slides only a relatively very short distance. While a slide switch was used as an example to illustrate Embodiment 5, a pushbutton switch as exemplified in Embodiments 1 and 2 can also be made to enable the operator to tactually feel switching on/off as the slide switch does. Embodiment 5 can also be applied to, for example, a rotary switch.

Although in the example in Embodiment 5, the operating element is moved to make the operator feel resistance during the touch by the operator for input operation, it is also possible to actuate the operating element so as to respond to a query instead of causing the sense of resistance.

Meanwhile, the switch devices of the foregoing Embodiments other than Embodiment 5 are such that their operating element is moved, according to circumstances, regardless of whether the operator performs input operation using the switch. The resultant motion pattern conveys some information to the operator. In other words, the switch devices of the foregoing Embodiments can serve their function without requiring operator input. It will be appreciated that these switch devices may use a touch element for touch by the operator instead of the operating element for touch and input operation by the operator, wherein the touch element serves only to convey information to the operator and is not capable of receiving input. A thus configured switch devices convey information to the operator through the touch element. Regardless as to whether it is an operating element or a touch element that the operator touches, there exists a possibility that certain vibration patterns may cause the moving operating element or the like to stop at a position that is relatively off-center on the substructure. When the operating element or the like then begins to move following the next vibration, there is a possibility that it may move beyond the vertical or horizontal boundaries defined by the structure. In consequence, there occurs a possibility that the operator cannot correctly recognize the vibration pattern. For this reason, it is desirable to control the switch device such that its operating element or the like will return, when appropriate, to an initial position, that is, a neutral reference position, at a predetermined timing or according to predetermined conditions. Specifically, this return may occur, for example, immediately after the operating element or the like is moved, based on one vibration pattern; upon the elapse of a predetermined time after the termination of its motion; immediately before motion is to begin, based on the next vibration pattern; or at display content change or input mode change. When initializing the switch device, that is, returning the operating element or the like to its initial position, it is advisable to generate vibration based on a predetermined pattern for initialization so that the operator will understand that initialization is being performed. In this way, by providing a specific initialization pattern, mistaking of initialization for another pattern can be prevented.

While switch device configurations characteristic of the present invention were explained in the foregoing Embodiments, some of these configurations may be appropriately combined for use. Also, while the switch devices of the foregoing Embodiments were described in examples applied to electronic equipment for on-vehicle use, the this is not a requirement of the present invention, which is applicable to electronic devices other than such onboard equipment.

What is claimed is:

1. A tactile interface device used as an input device or an output device of a car system comprising:
   a substructure member;
   an operating element for operation by an operator of said tactile interface device;
   a movable member which is mounted movably on said substructure member and to which said operating element is fixed; and
   an operating element drive controller that drives said operating element in one or two dimensions by moving said movable member;
   wherein said operating element drive controller generates one among a plurality of predetermined different motion patterns corresponding to the distance between the present position of the vehicle and a destination point, thereby providing the operator with tactile information indicating the distance from said present position to said destination point.

2. A tactile interface device as recited in claim 1, wherein said operating element drive control means drives said movable member to move in a motion pattern that provides a predetermined amount of resistance to an action of the operator.

3. A tactile interface device as recited in claim 1, wherein said tactile interface device is installed on a vehicle steering wheel at or near a location where an operator is likely to place their hands.

4. A tactile interface device as recited in claim 1, wherein said operating element drive control means returns said movable member to an initial reference position when predetermined conditions are met.

5. A tactile interface device used as an input device of a car navigation system comprising
   a substructure member;
   a touch element to be touched by an operator of said tactile interface device;
   a movable member which is mounted on and is movable relative to said substructure member and to which said touch element is fixed; and
   a touch element drive controller that drives said touch element in one or two dimensions by moving said movable member;

wherein, when the operator is manipulating said tactile interface device to shift a map displayed by said car navigation system, said touch element drive controller generates a predetermined motion pattern to provide the operator with tactile information indicating the distance by which the map display has been shifted.

6. A tactile interface device used as an input device or an output device for a car system comprising:

a substructure member;

an operating element for operation by an operator of said tactile interface device;

a movable member which is mounted moveably on said substructure member and to which said operating element is fixed; and an operating element drive controller that drives said operating element in one or two dimensions by moving said movable member;

wherein said operating element drive controller generates one among a plurality of predetermined different motion patterns corresponding to warning information about the motor vehicle on which said electronic equipment is mounted, thereby providing specific warning information to the operator in the form of tactile information.

7. A tactile interface device as recited in claim 6, wherein said operating element drive controller drives said movable member to move in a motion pattern that provides a predetermined amount of resistance to an action of the operator.

8. A tactile interface device as recited in claim 6, wherein said tactile interface device is installed on a vehicle steering wheel at or near a location where an operator is likely to place their hands.

9. A tactile interface device as recited in claim 6, wherein said operating element drive controller returns said movable member to an initial reference position when predetermined conditions are met.

* * * * *